United States Patent [19]
Cole

[11] 4,076,378
[45] Feb. 28, 1978

[54] TAPERED FIBER OPTIC ARRAY

[75] Inventor: Henry B. Cole, East Woodstock, Conn.

[73] Assignee: American Optical Corporation, Southbridge, Mass.

[21] Appl. No.: 664,726

[22] Filed: Mar. 8, 1976

[51] Int. Cl.² .............................................. G02B 5/14
[52] U.S. Cl. ................................ 350/96.24; 350/96.30
[58] Field of Search ............ 350/96 B, 96 BC, 96 WG

[56] References Cited

U.S. PATENT DOCUMENTS

| 3,187,627 | 6/1965 | Kapany | 350/96 BC X |
| 3,434,774 | 3/1969 | Miller | 350/96 WG |
| 3,756,688 | 9/1973 | Hudson et al. | 350/96 C |
| 3,808,549 | 4/1974 | Maurer | 350/96 WG X |
| 3,823,995 | 7/1974 | Carpenter | 350/96 WG |

Primary Examiner—John K. Corbin
Assistant Examiner—Rolf Hille
Attorney, Agent, or Firm—Alan H. Spencer

[57] ABSTRACT

A tapered fiber optic array for conveying light from one station to another with differently sized light reception and emission areas and precontrolled values of light receiving and emitting numerical aperture. The array comprises a unit of juxtapositioned multiple core, individually clad and tapered optical fibers. The taper ratio determines its light reception and emission area sizes while the refractive index values of individual fiber cores and cladding establish, in conjunction with the taper ratio, the numerical aperture characteristics.

4 Claims, 8 Drawing Figures

TAPERED FIBER OPTIC ARRAY

BACKGROUND OF THE INVENTION

1. Field of the Invention

This invention relates to fiber optics and has particular reference to improvements in arrays of tapered optical fibers.

2. Discussion of the Prior Art

For the purpose of carrying light from a closely spaced array of light sources or illuminated image elements to a relatively widely separated array, assemblies of monofibers have a definite functional advantage over the easier to manufacture assemblies of conventional tapered fibers; namely, the small size of the exit core which prevents overlapping or intermixing of light or image elements in the separated array and/or waste of emitted light by excessive spreading. Countering this advantage, however, are the difficulties, tediousness and costliness involved in arranging and supporting numbers of monofibers with their corresponding one end tightly juxtapositioned and opposite ends spaced apart. Tapered fibers, on the other hand, which can be readily and efficiently joined into tightly juxtapositioned relationship throughout their lenths for avoidance of the aforesaid manufacturing problems, produce relatively inefficient and/or inferior devices.

While predetermined different spacings between centers of corresponding opposite ends of fibers in conventional tapered arrays may be provided by selection of the taper ratio of the fibers or array, the large size of light exit core of each fiber, i.e. at the large end of the taper, causes the aforesaid adverse overlapping or intermixing of light or image elements and waste of emitted light by excessive spreading.

Accordingly, the hitherto need to make a choice between ungainly assemblies of monofibers with their difficulties and costliness of manufacture and conventional more compact and easily manufactured multifiber tapers with their drawbacks of relatively inefficient light or image element emission has, heretofore, left much to be desired in the art.

With a view to overcoming the aforesaid and corollary drawbacks or disadvantages of prior art fiber optic image-expanding or image-element-separating systems, the present invention provides the improvement in a tapered fiber optic array wherewith the taper ratio of the array as a whole can be selected to provide the desired image element spacing along with simultaneous control of numerical aperture.

SUMMARY OF THE INVENTION

The invention accomplishes the foregoing objective through the provision of a tapered fiber optic array formed of a plurality of juxtapositoned fibers in which each fiber has a plurality of cores of differing indices of refraction and an outer cladding of a lower refractive index than that of the cores. The provision of more than the conventional single core per fiber modifies the behavior of light traveling therethrough, making it possible to provide independent control over numerical aperture and magnification. A tapered fiber may be designed so that light entering one or more of its cores at its smallest end will exit from only the innermost core at the larger end of the taper.

Details of the invention will become more readily apparent from the following description when taken in conjunction with the accompanying drawings.

IN THE DRAWINGS

FIGS. 1A and B illustrate preferred embodiments of the invention (improved tapered fiber optic arrays) in an exemplary application of use;

FIGS. 2, 3, 4 and 5 are illustrations of pertinent prior art image-conducting devices, FIGS. 2 and 4 are plan views of arrays of aligned optical fibers and FIGS. 3 and 5 are end views of the respective arrays;

FIG. 6 is a greatly enlarged cross-sectional view of a tapered optical fiber which is exemplary of the improved type used according to the invention; and FIG. 7 is a view of the enlarged end of the fiber of FIG. 6.

DESCRIPTION OF THE PREFERRED EMBODIMENTS

Figure 1A:
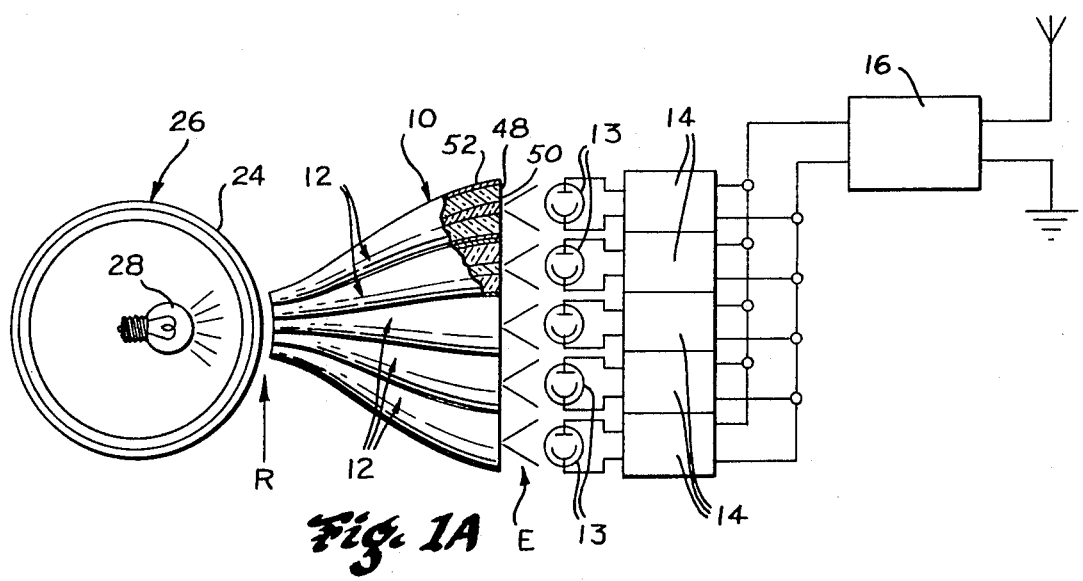
Figure 1B:
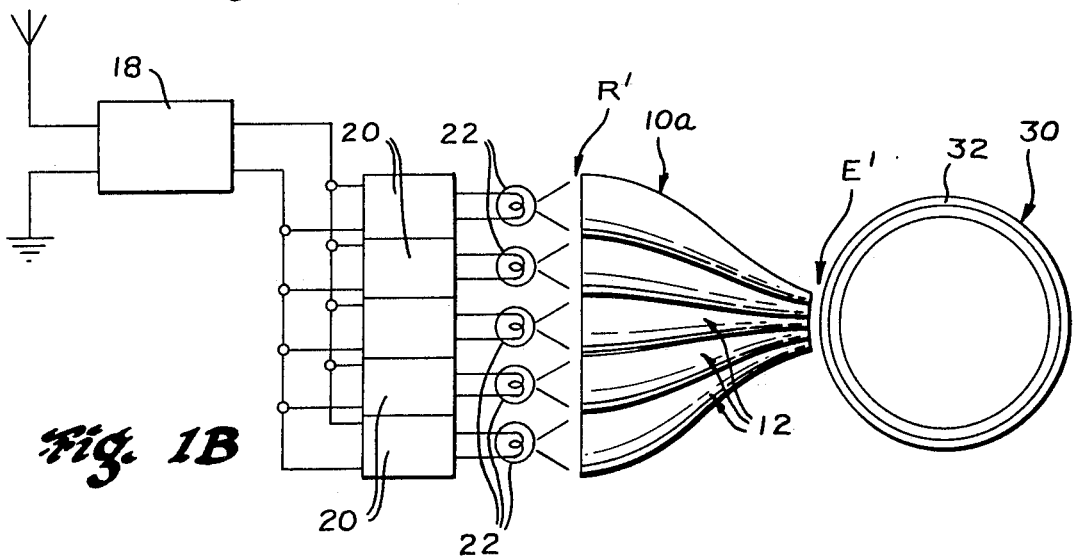

Referring more particularly to FIGS. 1A and 1B wherein, for purposes of better understanding the invention, there is illustrated tapered fiber optic arrays 10 (FIG. 1A) and 10a (FIG. 1B) in an exemplary application of use as image-element-conveying, separating or combining devices wherein an array of image-forming elements are carried from receiving stations R and R' to emitting stations E and E' respectively.

Arrays 10 and 10a are illustrated as being comprised of only five juxtapositioned tapered optical fibers 12, it being understood that less or more (i.e. several hundred or thousand or more) such fibers may be used in each array according to the needs of a particular application of use.

With the device of combined FIGS. 1A and 1B being schematically illustrative of a picture facsimile producing, transmitting and reproducing system, fibers 12 of array 10 each receive an element of an illuminated image at station R and convey the image element to station E whereat photodetectors 12 individually each receive the light of one image element for conversion into an electrical signal of an amplitude corresponding to that of the intensity of light received thereby. In the particular system of FIGS. 1A and 1B which is used for purposes of illustration only, electrical signals from photodetectors 12 are individually amplified by amplifiers 14 and transmitted by wireless transmitter 16 to receiver 18 (FIG. 1B). The electrical signals being therein separated and individually amplified by amplifiers 20 energize illuminators 22 (e.g. electrical lamps or light-emitting diodes) at receiving station R'. Optical fiber array 10a then conveys the signal received from illuminators 22 to emitting station E'. In the case of fascimile picture image transmission, a photographic transparency 24 placed upon drum 26 (FIG. 1A) and illuminated by light source 28 may be scanned by rotation of drum 26 and/or lateral movement of optical fiber array 10 wherewith array 10 will mosaically receive elements of the photographic image for transmittance as just described. The reproduction or fascimile image may be formed by means of a similar drum 30 (FIG. 1B) having a photosensitive paper thereon. Rotation of drum 30 and/or lateral movement of optical fiber array 10A in speeds and directions corresponding to those of drum 26 and array 10 during the transmission of signals from transmitter 16 will produce the fascimile.

Those interested in greater details of systems of the type shown in FIGS. 1A and 1B may refer to U.S. Pat. No. 1,751,584.

The present invention, in relating more particularly to an improvement in tapered optical fibers and arrays thereof will be hereinafter described with reference to array 10 (FIG. 1A) and its component fibers 12; one of the latter being illustrated with greater detail in FIGS. 6 and 7.

For ease in understanding the objectives of the present invention, there is illustrated in FIG. 2–5 examples of the previously mentioned prior art image-expanding or image-element-separating devices over which the invention has improved.

Figures 2, 3:
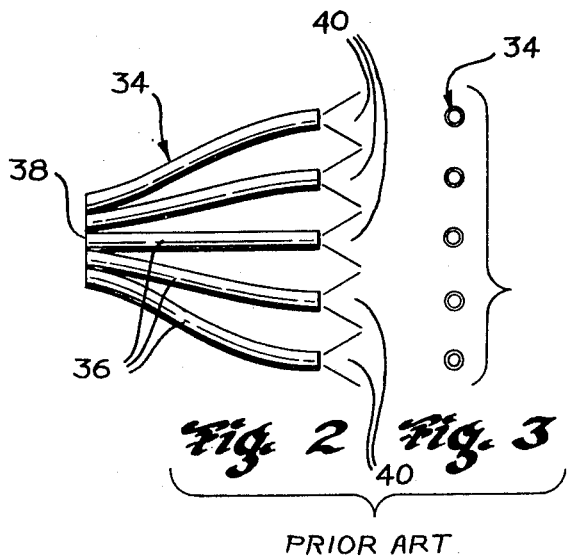
Figures 4, 5:
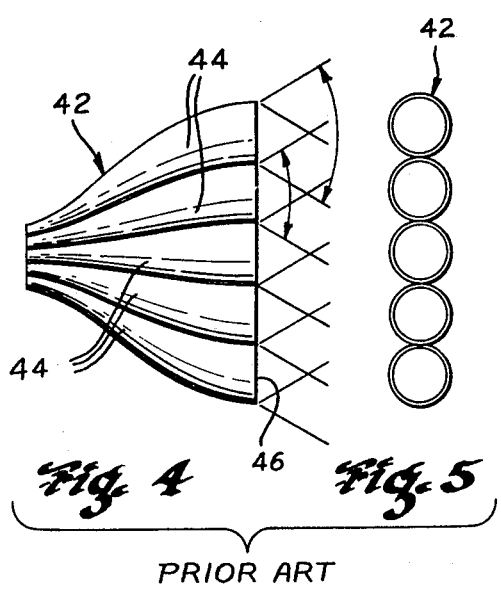

In FIGS. 2 and 3, there is shown a prior art assembly 34 of monofilaments 36 which are closely juxtapositioned adjacent one and 38 of the assembly and individually relatively widely spaced adjacent the opposite end. As such, the assembly, in mosaically receiving closely spaced arrays of light at end 38, will convey such light by the well-known principles of total internal reflection to the relatively widely spaced array at its opposite end. With this means, control of the size of output cone 40 of emitted light from each fiber may be achieved by simple selection of fiber 36 core and cladding glasses as taught in U.S. Pat. Nos. 2,825,260 and 3,060,789, for example, and which is readily understood by the artisan. The arrangement of assembly 34 provides the heretofore discussed advantage of control of the extent of illuminated image element separation without overlapping or intermixing of light adjacent light-emitting ends of the fibers 36.

A principal drawback to the use of prior art devices such as assembly 34 (FIGS. 2 and 3) is, however, the exceptional difficulty and costliness of its manufacture, particularly when large numbers of individual fibers have to be contended with. This has, in many cases, turned the manufacturer to the use of less optically efficient but more easily and economically fabricated prior art fiber optic tapers of the type illustrated in FIGS. 4 and 5.

While this latter type of device, as can be seen from U.S. Pat. No. 2,992,587, for example, produces image element magnification, its individually tapered fibers 44, each having but one core, emit light at the large end 46 of bundle 42 in overlapping relationship with the emitted light of adjacent fibers as depicted with arrows 43. This produces the above-mentioned intermixing of image elements and unwanted straying or waste of light.

The present invention, in overcoming the drawbacks of both of the types of prior art devices represented in FIGS. 2, 3 and 4, 5 accomplishes a result similar to that of FIG. 2 but uniquely without involving the heretofor complicated problems and costliness of making such devices of straight (untapered) monofilaments. It will become apparent that the present invention takes advantage of the simplification of manufacturing offered by tapered optical fibers of the type illustrated in FIGS. 4 and 5 but uniquely overcomes the above-discussed disadvantages of such fibers in assembled arrays thereof.

Figure 6:
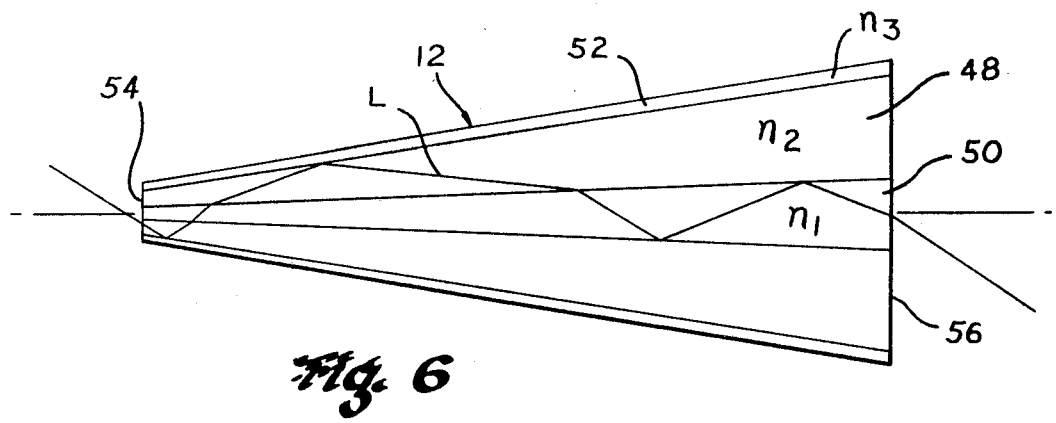
Figure 7:
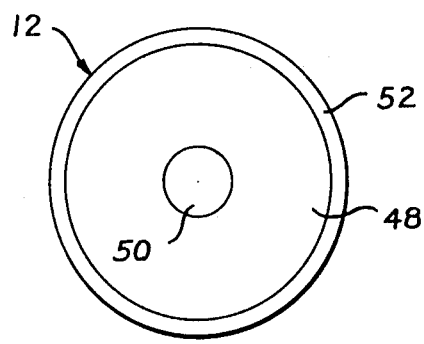

Referring more particularly to FIGS. 1A and 6, it can be seen that fiber optic array 10 is comprised of a multiplicity of individual fibers 12 wherein each fiber 12 (FIGS. 6 and 7) has a plurality of concentric cores of differing indices of refraction and an outer cladding having a lower refractive index than any of the cores. In the illustrated embodiment of fiber 12 (FIGS. 6 and 7), the lower index core 48 modifies the behavior of light being conducted through the fiber, making it possible to provide independent control over numerical aperture and magnification.

Such a double core fiber may be designed to cause light entering both of its cores 48 and 50 at the smaller end of the fiber to exit only from the highest refractive index core 50 at the larger end of the fiber. Accordingly, by so controlling the output area of a fiber optic array 10 on a fiber-by-fiber basis, a higher than usual output numerical aperture (NA) is made possible without the scattering and overlapping of light as is the case in prior art devices such as that illustrated in FIG. 3, for example. In other words, it is possible to devise, according to the invention, an array 10 that provides an output of light over a specified NA and does not waste light by spreading it beyond that NA.

Referring more particularly to FIG. 6 wherein the function of the present double core tapered fibers 12 of optical array 10 is diagrammatically illustrated, it will be seen that modification of the behavior of light transmitted therethrough by the additional core 48 makes independent control over numerical aperture and magnification possible as follows:

Such a double core fiber may be designed to cause light entering both of its cores 48 and 50 at the smaller end of the fiber to exit only from the highest refractive index core 50 at the larger end of the fiber. Accordingly, by so controlling the output area of a fiber optic array 10 on a fiber-by-fiber basis, a higher than usual output numerical aperture (NA) is obtained.

Referring more particularly to FIG. 6 wherein the function of the present double core tapered fibers 12 of optical array 10 is diagrammatically illustrated, it will be seen that modification of the behavior of light transmitted therethrough by the additional core 48 makes independent control over numerical aperture and magnification possible as follows:

With inner core 50 of high index of refraction $n_1$, outer core 48 of an intermediate index of refraction $n_2$ and cladding 52 of a lower refractive index $n_3$, light within a given NA value $\overline{NA}_{i2}$ entering the outer core 48 at the small end 54 of fiber 12 will be emitted only from the centermost core 50 at the large end 56 of fiber 12. This light, represented by line L, upon entering the outer core 48, is initially contained within this outer core by total internal reflection at the $n_2$, $n_3$ interface.

As the fiber diameter increases, however, the NA will decrease and the light crossing back and forth across the inner core 50 will, at a point P, reach the critical angle of reflection of the $n_1$, $n_2$ interface. From this point on, the light will continue through only the inner core by the well-known principles of total internal reflection at the $n_1$, $n_2$ interface and will emerge from the large end 56 within an NA of value $\overline{NA}_{i1}$.

It is to be understood that the NA of a system such as fiber 12 (FIGS. 6 and 7) or array 10 of fibers 12 (FIG. 1A) is the sine of the angle of the extreme meridional array which will be trapped within a fiber upon entering the fiber or emitted therefrom upon reaching the emitting end of the fiber.

The array 10, for purposes of carrying light from a closely spaced system of light sources or illuminated image elements to relatively widely separated points, may comprise a single layer of fibers, i.e. be of one fiber thickness and the fibers may be circular in cross-section, square, hexagonal or of other desired configurations. In the final structure of the array (e.g. array 10 or 10a) the fibers may be fused, cemented, tied or otherwise bound together as a unit. Such a unit can be formed by assembling a multiplicity of untapered fibers together in a desired pattern, such as a linear array, and tapering the assembly as a whole by heating and drawing. U.S. Pat. Nos. 2,992,516 and 2,992,587 may be referred to for details of heating and drawing operations useful in the making of tapered optical fibers.

An analysis of the requirements of taper ratio and refractive indices required of core and cladding components of fibers used in producing tapered fiber optic arrays according to the present invention is as follows:

As light travels along a tapered fiber it changes numerical aperture according to the rule that the product, $\overline{NA}^2 x$ area, tends to remain constant. For a single core tapered fiber this gives the simple relation:

$$\overline{NA}_s^2 = r^2 \overline{NA}_l^2 \quad (1)$$

Where $\overline{NA}_s$ is the numerical aperture of the light at the small end, $\overline{NA}_l$ is the numerical aperture of the same light at the large end, and $r^2$ is the ratio of the core areas at the two ends.

The same rule may also be used to predict the changing numerical aperture in a multiple core tapered fiber. In using the rule, however, it is necessary to take into consideration the relative areas devoted to the various cores and also the fact that the light assumes different numerical aperture values in the different cores. In tapered multiple core fibers, the value that tends to remain constant is the sum of the $\overline{NA}^2 x$ area products for all of the cores to which the light has access. Applied to a fiber of two cores, this gives the relation:

$$\overline{NA}_{s1}^2 a_1 + \overline{NA}_{s2}^2 (1-a_1) = r^2 \overline{NA}_{l1} a_1 + \overline{NA}_{l2}^2 (1-a_1) \quad (2)$$

where $a_1$ is the fraction of the total core area devoted to the material of index of refraction, $n_1$. In this two core case, the remaining core area is occupied by a second core of index, $n_2$.

Snell's Law, which defines the bending of light at a boundary between materials of differing indices of refraction, is used to provide the relationship between $\overline{NA}_{s1}$, the numerical aperture in the $n_1$ core at the small end, and $\overline{NA}_{s2}$, the numerical aperture in the $n_2$ core at the same end, as follows:

$$\overline{NA}_{s1}^2 = \overline{NA}_{s2}^2 + n_1^2 - n_2^2 \quad (3)$$

Snell's Law provides a similar relationship between the NA values in the two cores at the large end:

$$\overline{NA}_{l1}^2 = \overline{NA}_{l2}^2 + n_1^2 - n_2^2 \quad (4)$$

By suitably applying relations (2), (3), and (4), one may determine the outputs from both cores that will result from an input into either core in any NA range. And the same basic approach may be extended to fibers of any number of cores, provided that the index of refraction values, taper ratio, and relative core areas are known.

In applying the above rules, it is advisable to check, at each end of the taper, which cores the light may enter and what constraints may limit the NA values. A useful example, in the two core case, may be examined by combining relations (2), (3), and (4) and solving for $\overline{NA}_{l1}^2$ in terms of $\overline{NA}_{s2}^2$, wich gives:

$$\overline{NA}_{l1}^2 = \frac{1}{r^2} [\overline{NA}_{s2}^2 + (n_1^2 - n_2^2)a_1] + (n_1^2 - n_2^2)(1 - a_1) \quad (5)$$

This relation is appropriate for use when:

$$\overline{NA}_{l1}^2 \geq n_1^2 - n_2^2$$

i.e., when the light under consideration is still traveling in both cores and is not yet captured by the $n_1$ core. The NA for the portion of the light emerging from the $n_2$ core is found from (4) to be:

$$\overline{NA}_{l2} = [\overline{NA}_{l1}^2 - (n_1^2 - n_2^2)]^{\frac{1}{2}} \quad (6)$$

If in using equation (5), it is found that:

$$\overline{NA}_{l1}^2 < n_1^2 - n_2^2$$

It is obvious that $\overline{NA}_{l2}^2$ would be negative and that $\overline{NA}_{l2}$ would be imaginary. This would be a clue that the light could no longer cross back and forth between $n_1$ and $n_2$ but would have been captured by the $n_1$ core. If this is found to be the case, the following relation should be used in place of equation (5):

$$\overline{NA}_{l1}^2 = \frac{1}{r^2} \left( \frac{\overline{NA}_{s2}^2}{a_1} + n_1^2 - n_2^2 \right) \quad (7)$$

This relation is appropriate when:

$$\overline{NA}_{l1}^2 \leq n_1^2 - n_2^2$$

Equation (7) is found by combining equations (2) and (3) after setting $\overline{NA}_{l2}$ equal to zero (representing no light in core $n_2$ at the large end).

Equation (7) is probably the most useful relation for double core tapered fibers, it being applicable when light enters the lower index core at the small end and is captured by the higher index core to emerge from it at the large end. The reason for needing both equations (5) and (7) to describe $\overline{NA}_{l1}$ over the full possible range is that, upon capture, the light undergoes a discrete change in the way the numerical aperture varies with diameter. Before capture, it follows the rule for a double core fiber; after capture it behaves as in a conventional single core tapered fiber.

A fiber optic array exhibiting the characteristics discussed hereinabove may be reduced to practice as follows using design parameters:

| | |
|---|---|
| Index of refraction of higher index core | $n_1 = 1.72$ |
| Index of refraction of lower index core | $n_2 = 1.60$ |
| Index of refraction of cladding | $n_3 = 1.48$ |
| Fraction of core area devoted to $n_1$ | $a_1 = .04$ |
| Taper ratio | $r = 10$ |

The maximum numerical aperture that can be accepted by the $n_2$ core at the small end will be determined by the $n_2$, $n_3$ interface and will be

| | |
|---|---|
| $\overline{NA}_{s2}^2{}_{(max)}$ | $= n_2^2 - n_3^2$ |
| | $= 1.60^2 - 1.48^2$ |
| | $= .37$ |
| $\overline{NA}_{s2\,(max)}$ | $= .61$ |

The corresponding input into the $n_1$ core will be:

$$\overline{NA}_{s1}{}^2{}_{(max)} = \overline{NA}_{2s}{}^2{}_{(max)} + n_1{}^2 - n_2{}^2$$
$$= .61^2 + 1.72^2 - 1.60^2$$
$$= .37 + .40$$
$$= .77$$
$$\overline{NA}_{s1\,(max)} = .88$$

This light also will be marginally retained at the $n_2$, $n_3$ interface.

Anticipating full trapping into the $n_1$ core, equation (7) may be used to predict the maximum NA in that core at the large end:

$$\overline{NA}_{l1}{}^2{}_{(max)} = \frac{1}{r^2}\left(\frac{\overline{NA}_{l2}{}^2}{a_1} + n_1{}^2 - n_2{}^2\right)$$

$$= \frac{1}{10^2}\left(\frac{.61^2}{.04} + 1.72^2 - 1.60^2\right)$$

$$= .096$$

$$\overline{NA}_{l1\,(max)} = .31$$

The NA limit in the $n_1$ core for fully trapped light would be:

$$\overline{NA}_{l1\,(capture)} = (n_1{}^2 - n_2{}^2)^{\frac{1}{2}}$$
$$= (1.72^2 - 1.60^2)^{\frac{1}{2}}$$
$$= .63$$

Since the 0.30 value found above is less than 0.63, the input light would be fully captured and equation (7) is the appropriate equation for predicting the output numerical aperture. Thus, all of the light accepted by both cores at the small end and transmitted to the large end may be expected to emerge from the higher index core in the range of up to approximately 0.31 NA.

I claim:

1. In an array of tapered optical fibers having their corresponding smaller and larger ends respectively tightly juxtapositioned, the improvement of means for transmitting light from a closely spaced array of light sources adjacent said juxtapositioned smaller ends of said fibers to a multiplicity of individually relatively widely spaced emitting areas at said juxtapositioned larger ends of said fibers, said means comprising:

each of said tapered fibers having respectively relatively large and small opposite ends and a core comprising first and second concentric similarly tapered and joined together components, the first of said components being centermost and having at said large end of said fiber a light transmitting face of an area size substantially less than that of said large end of said fiber and corresponding to the size desired of one of said spaced light emitting areas of said array, said first component of said core being of higher refractive index than said second concentric component and said second component acting to space said light transmitting face from adjacent edges of said fiber and from said light emitting areas of adjacent fibers of said array; and said multple component core having an outer intimately surrounding relatively thin cladding of material of lower refractive index than said second core component for rendering said whole fiber internally reflective to light, the refractive index differential of said first and second core components and their taper ratio being selected according to the numerical aperture output and magnification desired of said array.

2. An array of optical fibers according to claim 1 wherein said plurality of cores and said cladding are all formed of glass and are fused together as an integral unit.

3. A tapered optical fiber having relatively large and small opposite ends comprising:

a core having first and second concentric similarly tapered and joined together components, the first of said components being centermost and having at said large end of said fiber a light transmitting face of an area size substantially less than that of said large end of said fiber and being of a higher refractive index than said second concentric component; and a relatively thin cladding of material of lower refractive index than said second core component surrounding and joined to said multiple component core for rendering said fiber internally reflective to light, the refractive index differential of said first and second core components and their taper ratio being selected according to the numerical aperture output and magnification desired of said fiber.

4. An optical fiber according to claim 3 wherein said plurality of cores and said cladding are all formed of glass and are fused together as an integral unit.

* * * * *